Oct. 5, 1965　　MITSUGU MIURA　　3,209,793
APPARATUS FOR MANUFACTURING STEEL SKELETON
FOR REINFORCED CONCRETE
Filed Aug. 4, 1961　　3 Sheets-Sheet 1
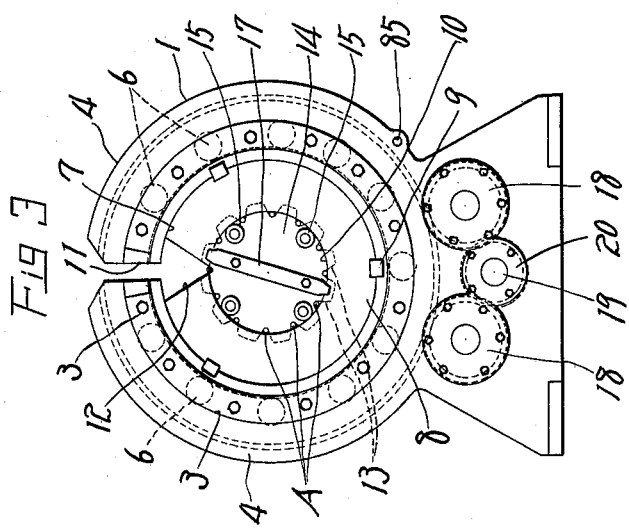
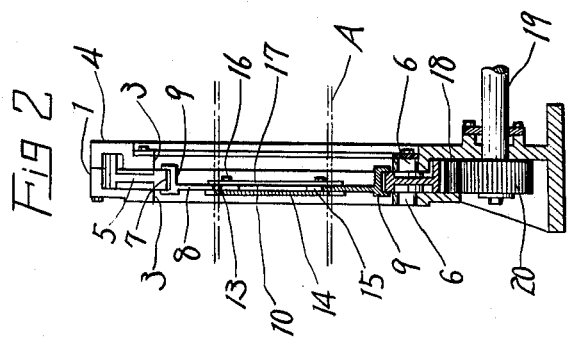
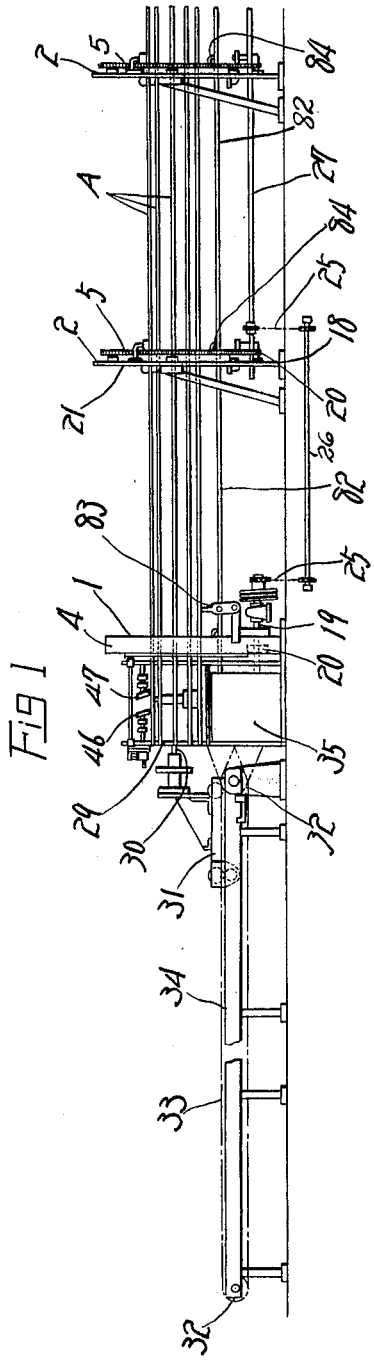
INVENTOR.
MITSUGU MIURA Oct. 5, 1965   MITSUGU MIURA   3,209,793
APPARATUS FOR MANUFACTURING STEEL SKELETON
FOR REINFORCED CONCRETE
Filed Aug. 4, 1961   3 Sheets-Sheet 2
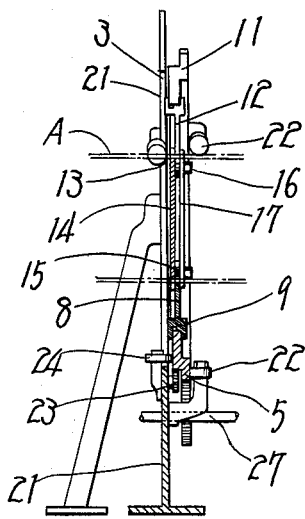
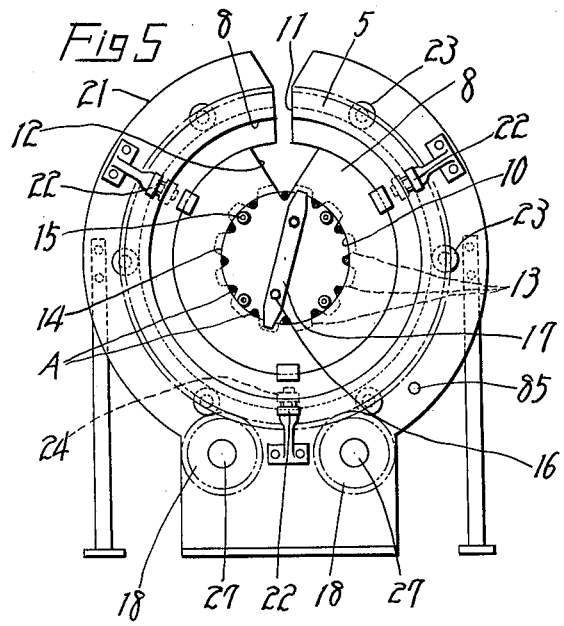
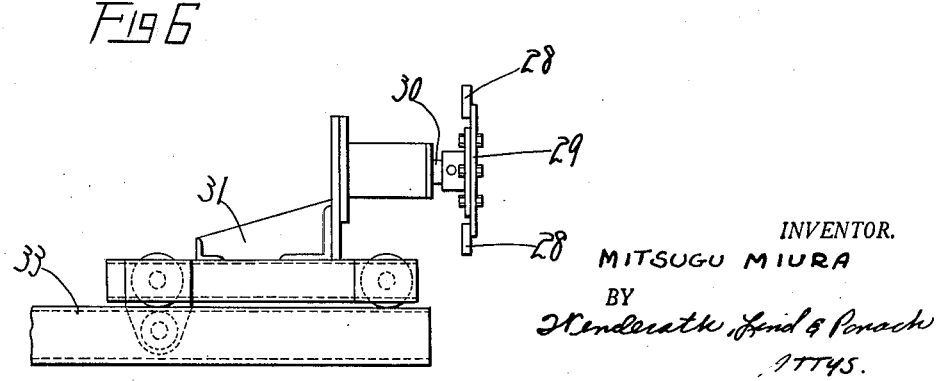
INVENTOR.
MITSUGU MIURA
BY
ATTYS.

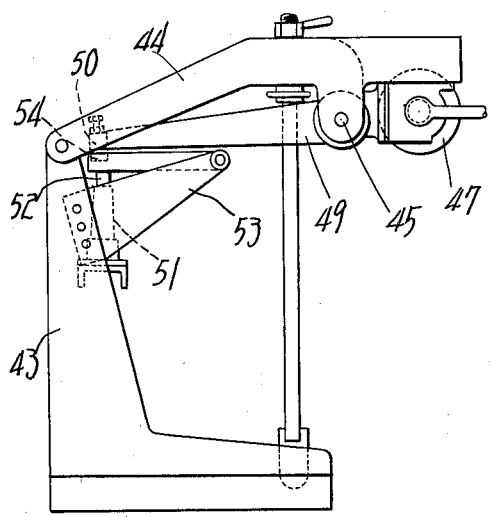
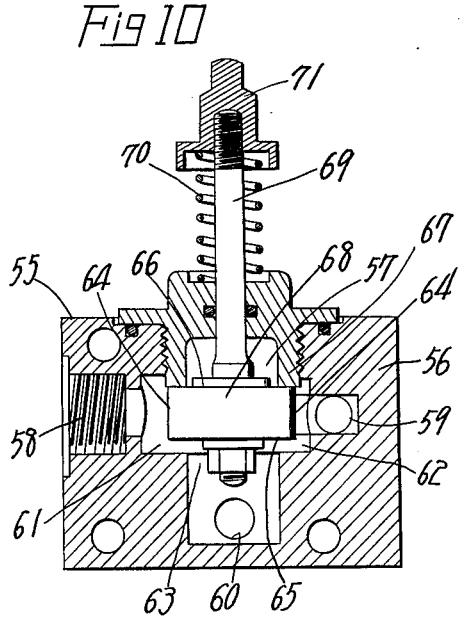
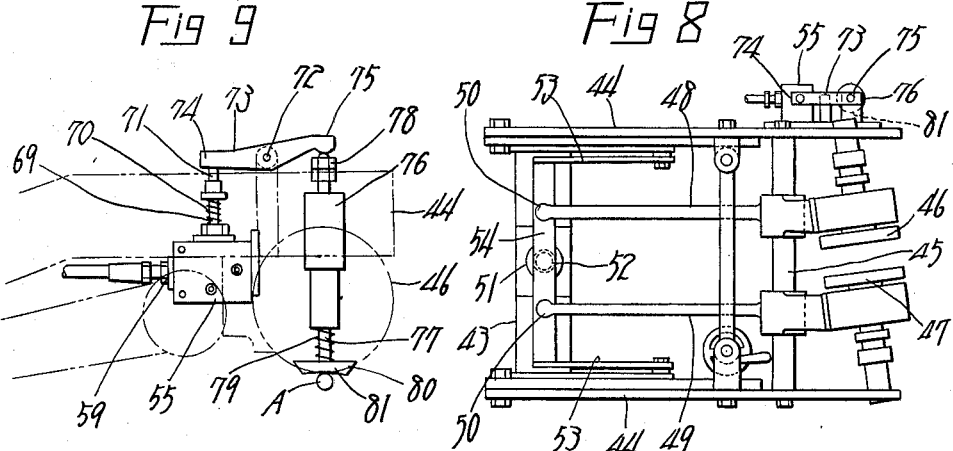
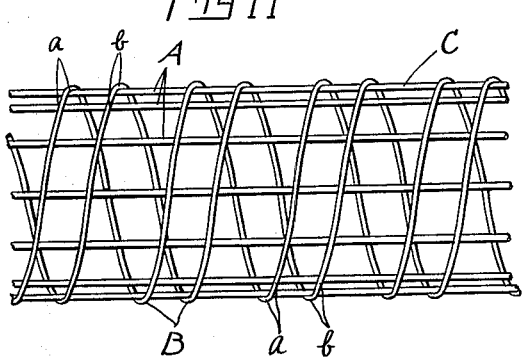

United States Patent Office 3,209,793
Patented Oct. 5, 1965

3,209,793
APPARATUS FOR MANUFACTURING STEEL
SKELETON FOR REINFORCED CONCRETE
Mitsugu Miura, 13 2-chome, Tezukayamahigashi,
Sumiyoshi-ku, Osaka-shi, Osaka-fu, Japan
Filed Aug. 4, 1961, Ser. No. 129,300
5 Claims. (Cl. 140—112)

This invention relates to the manufacture of an assembly of steel rods for a reinforced concrete rod. The assembly consists of several straight steel rods parallel to each other on a circle and a pair of spiral steel rods along the cylindrical surface composed of the former rods, where every cross point of the straight and spiral rods is electric-welded.

An object of the invention is to provide a method and apparatus for manufacturing steel skeleton by advancing a plurality of the steel rods in one direction and rotating them around a cylindrical surface formed by those rods, and by electric-welding the two spiral rods on the straight rods.

Another object of the invention is the mass production of the steel skeleton with high efficiency by an automatic device where these skeletons have hitherto been produced by manual methods. A further object of the invention is to provide the steel skeleton by continuous electric-welding of the spiral steel rods to the longitudinal ones without bending of the latter. Other objects and advantages of the invention will appear hereinafter.

A preferred embodiment of the invention selected for purposes of illustration is shown in the accompanying drawings, in which, FIG. 1 is a side view of the apparatus of the invention shown as a whole assembly, FIG. 2 is a side part sectional view of a supporting device, for the longitudinal rods, including a rotatable disc driven by an external driving means, FIG. 3 is a front elevation view of the device shown in FIG. 2, FIG. 4 is a side part sectional view of another auxiliary supporting device, FIG. 5 is a front elevation view of the device of FIG. 4, FIG. 6 is a side view of a transporting device for the rods, FIG. 7 is a side view of a spot-welding device, FIG. 8 is a plan view of the same, FIG. 9 is an enlarged side elevation view to illustrate the spot-welding mechanism, FIG. 10 is an enlarged sectional view of a valve for the oil plunger of the electric welder, and FIG. 11 is a side view of a steel skeleton produced by the method of the invention.

Referring to FIG. 1, a plurality of steel rods A are located at a definite distance from one another in a circle. These are supported by a suporting device 1 and plural auxiliary supporting devices 2, the number of which is determined by the length of the rods A.

As shown best in FIGS. 2 and 3 in which members having the same function are designated by the same reference characters, a main gear 5 rotates about its central axis, supported in supporting rollers 6, 6 in a housing 4 having a circular opening 3 with the same axis at both sides of the housing 4. A rotary disc 8 is fixed to the inner periphery 7 of the gear 5 using a fixing member 9 and has a central hole 10 with the same axis. Both the gear 5 and disc 8 are broken at notches 11 and 12 respectively for the purpose of positioning a steel rod A. A rotatable supporting disc 14 is attached to the rotary disc 8 at the inner surface of its inside periphery 10 by means of rollers 15 which bear on the surface 10. The disc 14 has radial notches 13 in its periphery. The depth of the notch 13 is such as to make an interstice between the notch and the periphery of the inner periphery 10 of the disc 8 for the purpose of gripping a steel rod A through the interstice. Further, the disc 14 is provided with a holder 17 to hold the disc 14 against the disc 8 from the other side thereof by holding bolts 16, 16 if necessary. Thus the disc 14 can rotate with or without the disc 8 as desired. The gear 5 engages with gears 18, 18 which are journaled in the housing 4 and driven by a gear 20 through a shaft 19.

Referring to FIGS. 4 and 5, the structure of the auxiliary supporting device 2 is shown in which the gear 5, the disc 8, the disc 14, and the holder 17 have the same structure and functions as those of the main supporting device 1. In this device 2, instead of being supported in the housing 4, the gear 5 is supported by three sets of rollers composed of three supporting rollers 22, 23, and 24 mounted on stand 21. These are fixed to a supporting base disc 2. The rollers 22, 23, and 24 bear on both sides and the periphery of the outer part of the gear 5. The stand 21 and the base disc 2 are also broken for the purpose of insertion of a steel rod.

The gear 5 of the device 2 is driven by the shaft 19 through a transmission means 25, a shaft 26, a pair of transmission shafts 27, 27, and gears 18, 18 which engage with the gear 5 and thus operate the same as the device 1.

Supporting and rotating of the steel rods A are carried out by the above mentioned mechanism. Referring to FIGS. 1–6, a method of advancing of the rods in one direction is illustrated. A pulling disc 29 is provided with holders 28 for hooks formed at the ends of the steel rods and it is fixed to a driving shaft 3 which rotates about its axis with the disc 29. The shaft 30 is held on a transporting frame 31 which is partially connected with a cyclic chain system 34 comprising chain wheels 32 and chain 33. The chain system 34 moves in both directions through a variable speed reversible transmission means 35 of any one of a plurality of types common in the art which is driven by the main shaft 19. The transporting speed can be varied by these means as desired. By this variable speed, the pitch of the spiral steel rods can be controlled.

A method and apparatus for electric welding are best shown in FIG. 7 and FIG. 8. The welding device is located at a position between the main supporting device 1 and the pulling disc 29. A pair of supporting arms 44, 44 are pivoted at the upper ends of a stand frame 43. A supporting shaft 45 extends between the pair of arms 44, 44. Arms 48 and 49 carrying the electrodes 46 and 47 respectively are supported on the shaft 45 and rotate about the axis of the shaft 45. The ends 50 of both arms 48 and 49 are fitted on an up and down arm 54 which is fixed at the end of a pair of arms 53. The arms 53 rotate by the raising or lowering of the ram 52 attached to a cylinder 51 of an oil plunger. The supporting arm 44 is provided with a valve 55 to raise or to lower the ram 52.

As shown best in FIGS. 9 and 10, the valve body 55 comprises a housing 56, a valve chamber 57 enclosed by said housing, an inlet 58 for oil from an oil tank through a pipe, an outlet 59 to the cylinder 51, another outlet 60 for return of oil to the tank by a pump, open passages 61, 62 and 63 for the inlet 58, the outlet 59 and 60 respectively, side surface 64 and bottom surface 65 of the valve disc face opposed to the above passages 61, 62, and 63. Upper surface 66 normally lies against the valve seat 67. An upper extension 69 extends upwardly from the valve disc, and a spring 70 bears against a knob 71 on the upper end of the extension 69.

In the normal state, the passages 61, 62 and 63 are connected to each other, the outlet 59 is connected with the cylinder 51 through a pipe, and the oil is circulated by the pump. The upper extremity of the knob 71 abuts the lower surface 74 of the lever 73 which pivots at the pivot 72. Another end 75 of the lever 73 is located at a position nearer to the main supporting device than that of the both electrodes 46 and 47. A supporting cylinder 76 is fixed to the supporting arm 44. A slidable rod 77 inserted into the cylinder 76 abuts the lever 75 at its upper end 78. This rod 77 is pushed downwardly by a spring 79. The lower extremity of the rod 77 is provided with an operating disc 81 having conical side surface 80 which contacts the steel rod A.

In order to give the gears 5 of the supporting devices 1 and 2 definite positions, operating shafts 82 with a handle 83 are slidably mounted on the apparatus and each stopping bar can be inserted into one of the holes 85 of the gear 5.

In the operation of the apparatus of the invention, the gears 5 of the supporting devices 1 and 2 are fixed in certain positions by inserting the stopping bars 84 into the holes 85 after advancing the operating shaft 82 by the handle 83. By this operation, the rotary disc 8 is also fixed but the rotable supporting disc 14 can rotate. At this point, a piece of steel rod is put into the notch 13 of the disc 14 through the notch 11 and 12 of the gear 5 and the disc 8 respectively. The rod thus set in the first notch is carried to the next position by rotation of every disc 14 of every supporting device at the same time and then all notches will be filled with rods A. The rods are held in a circle without distortion in the position between the notches 13 and the inner periphery 10 of the disc 8.

After this operation, when the operating shaft 82 is returned to the original position by the handle 83 and the stopping bar 84 is taken out of the hole 85, then the gear 5 rotates freely. The gear 5 in the main supporting device 1 rotates by the driving of the main shaft 19, through a pair of the transmission gears 18, 18 and then the rotation is transmitted to the gear 5 of the auxiliary supporting devices 2 through the transmission means 25, the shaft 26, a pair of the transmission shafts 27, 27 and a pair of gears 18, 18 in the respective devices 2.

That the gears 18 are a pair serves to insure one or the other gear 18 engaging with the gear 5 in spite of existence of the interruption in the gear 5. All steel rods rotate and are supported by the devices 1 and 2. The U-shape extremity of the rod A is hooked on the holder 28 of the pulling disc 29 which rotates about the rotary shaft 30 freely. The transporting frame 31 advances gradually towards the left hand end of the drawing of FIG. 1 by the action of chain 33, the chain wheel 32 and the cyclic transporting means 34, resulting in rotary and straight movement of the rod A assembly. At the same time two other steel rods B, B are sent perpendicularly to the straight rods A from a suitable means so as to pass the rod B and B just below the pair of the electrodes 46 and 47 and then the rods B, B are wound on the cylindrically located rods A in a spiral path because of rotation and the advancing of the rods A.

In apparatus of the invention, as shown in FIG. 7 to FIG. 11, cross points $a$ and $b$ of the latitudinal rod B to the longitudinal rod A are spot-welded by contact of roll electrodes 46 and 47 with the rods B. For this purpose, the electrodes 46 and 47 must be lowered to contact with the rods only when the rods A and B are crossed.

In order to lower them, the oil plunger and its accessory provided for the electrode 46 and 47 are operated. The operating rod 77 is located on the center line of the electrode discs 46 and 47 and on opposite side thereof from the advancing direction of the longitudinal rods A and the lower extreme disc 81 of the operating rod 77 is located at the periphery of the circle formed by the long rods A.

Therefore, when a rod A rotates and advances to the conical surface 80 of the disc 81, the disc 81 is raised against the downward force of the spring 79 and it will be lowered by the force of the spring after the rod A passes over the bottom surface of the disc 81. Raising of the upper extremity 78 causes raising of the head 75 of the lever 73 and lowering of the operating rod 77 will cause return of the head 75 to the original position. Every time the rod A passes across the surface of the disc 81, the lever 73 pivots around the axis of the pivot 72. The other end 74 of the lever 73 is lowered or raised when the rod A comes to the position of the electrodes 46 and 47. This causes raising or lowering of the knob 71 at the extremity of the upper extension 69 of the valve disc 68 cooperating with the spring 70. In an ordinary situation, the valve disc 68 is raised by the force of the spring 70 and oil can pass through the passages 61, 62 and 63. In this state, the oil is circulated by a pump (not shown) from a tank through the inlet 58, passages 61 and 63 and oil in the cylinder 51 also returns to the tank through the passages 62 and 63. Therefore the ram 52 of the cylinder 51 does not operate. When the rod A comes to the position of the electrodes 46 and 47, raising of the operating rod 77 causes lowering of the end 74 of the lever 73 to push the knob 71 down, resulting in closing of the passage 63 by the lower surface 65 of the valve disc 68. The closing makes the ram 52 of the cylinder 51 rise due to the pressure of oil entering into the passage 62 through the passage 61. As shown in FIG. 7 and FIG. 8, when the raising of the ram 52 causes upward movement of the bar 54 of the arms 53 the ends 50, 50 of the supporting levers 48 and 49 are pushed upwardly and accordingly the electrodes 46 and 47 are lowered to spot-weld the longitudinal steel rod A at the cross points $a$ and $b$ on the latitudinal steel rods B, B which are carried from the side device. Every time the longitudinal rod A comes to the electrodes 46 and 47 during rotation of the rod A, the cross points $a$ and $b$ of the two latitudinal rods B, B and a longitudinal rod A are spot-welded by lowering of the electrodes 46 and 47 according to operation of the oil plunger. The thus welded assembly $c$ of the steel rods are sent forwardly by advancing of the pulling disc 29.

Advantages of the invention are as follows:

Manufacture of the pile concrete skeleton is made nearly fully automatic compared with former methods in which the longitudinal steel rods are put on a roller and one other steel rod is wound around the roller while manually binding the cross points of these rods with steel wire, or instead of the manual binding the spot-welding is carried out. These former methods can not prevent distortion of the rod assembly. According to this invention such distortion does not occur and no large matrix is necessary. In this invention, advance and rotation are carried out at the same time while holding the rods in a circle, and continuous spiral binding of two spiral steel rods is carried out at one definite position. Therefore it is not necessary to transport an electric welder as in a former method in which the perfect welding was difficult due to the electric effect being different at the initial and final welding because the longitudinal steel rods were used as electrodes. In this invention, electrical loss is minimum and stable welding is possible. Distortion of the skeleton does not take place because of use of the supporting devices.

According to the apparatus of the invention, only two operators are necessary and an eightfold increase in the production of the skeleton is attained automatically compared with the usual method.

What I claim is:

1. An apparatus for assembling a skeleton of reinforcing rods for a reinforced concrete pile or the like, comprising a plurality of axially aligned rod supporting and rotating means for supporting a circular cage of longitudinally extending rods so as to be slidable in the direction of their length and rotating the cage of rods around the longitudinal axis of the cage, rotating means coupled to said supporting means for simultaneously rotating all of the supporting means, a further supporting means movable in the direction of the alignment of the rod supporting means, moving means coupled to said further supporting means for moving said further supporting means in the direction of the length of the rods, means adjacent the supporting means next to said further supporting means for feeding at least one further rod toward said cage, a welding means adjacent said feeding means and movable toward and away from the cage for welding the fed rod to said longitudinal rods, and welding feed means positioned adjacent said cage of rods and coupled to said welding means for moving said welding means toward said cage of longitudinal rods, said welding means having a control therefor including a feeler means engageable by the successive individual rods of said cage as they pass the position of said feeler means during the rotation of said cage for actuating said welding feed means for moving said welding means toward said cage.

2. An apparatus as claimed in claim 1 in which said supporting means each comprise a housing having a circular opening through the center thereof, an annular gear rotatably supported in said housing and having the central opening thereof coaxial with the circular opening through the housing, said means for rotating said supporting means being geared to said annular gear, a disc rotatably mounted in the central opening of said gear and having a central opening therein coaxial with the opening in the housing and the gear, said housing, gear and disc each having a gap in the periphery thereof, and a supporting disc rotatably mounted over the central opening of said disc with a diameter larger than the diameter of the central opening of the disc and having a plurality of notches spaced around the periphery thereof, said notches extending into the supporting disc to a point inward of the edge of the central opening of said disc to leave holes between said supporting disc and the edge of the central opening of said disc for holding the longitudinally extending rods.

3. An apparatus as claimed in claim 2 in which said housing and disc have walls defining at least the radially outward part of the gap in the housing and disc which walls are outwardly diverging.

4. An apparatus as claimed in claim 1 in which said welding means comprises at least one lever arm pivotally mounted for movement of one end of said arm toward and away from the rod cage, and welding electrodes mounted on said one end of said arm, and said welding feed means comprises means coupled to the other end of said arm for raising said other end of said arm to pivot said arm when the feeler of said welding feed means is engaged by the successive individual rods of the cage.

5. An apparatus as claimed in claim 4 in which said means coupled to the other end of said arm is a hydraulic piston-cylinder means, and said feeler means comprises a feeler and said control means is a valve means coupled to said piston-cylinder means and actuated by said feeler means to open and admit fluid to said piston-cylinder means when said feeler is engaged by a rod.

References Cited by the Examiner

UNITED STATES PATENTS

| | | | |
|---|---|---|---|
| 1,030,215 | 1/12 | Wacker et al. | 113—130 |
| 1,763,996 | 6/30 | Willers | 29—163.5 |
| 2,046,457 | 7/36 | Johnson | 29—163.5 |
| 2,046,461 | 7/36 | Johnson | 29—163.5 |
| 2,178,671 | 11/39 | Osborn | 113—130 |
| 2,312,459 | 3/43 | Williams | 29—163.5 |
| 2,323,713 | 7/43 | Harmon | 29—163.5 |

FOREIGN PATENTS 400,790  11/33  Great Britain.

CHARLES W. LANHAM, *Primary Examiner.*

NEDWIN BERGER, *Examiner.*